United States Patent Office 3,352,765
Patented Nov. 14, 1967

3,352,765
EXTRACTIVE DISTILLATION OF SULFOLANE WITH AN ISOPARAFFINIC HYDROCARBON ENTRAINER
Paul F. Warner and James L. Willis, Phillips, Tex., assignors to Phillips Petroleum Company, a corporation of Delaware
No Drawing. Filed Dec. 21, 1964, Ser. No. 420,174
7 Claims. (Cl. 203—70)

ABSTRACT OF THE DISCLOSURE

Purification of sulfolane solvent to remove by-product oil therefrom is achieved by extractive distillation of the mixture sulfolane and by-product oil with an isoparaffinic hydrocarbon entraining agent.

---

This invention relates to a process for the treatment of sulfolane. In one aspect this invention relates to a process for the purification of sulfolane.

The sulfolanes are well known solvents useful in extractive distillations, solvent extractions and the like, especially in petroleum processing for the separation of hydrocarbon mixtures. They are prepared by reacting a conjugated diolefin with sulfur dioxide and hydrogenating the resulting sulfolene to the corresponding sulfolane. Thus sulfolane and the mono- and dimethyl sulfolanes are prepared by reacting butadiene, methylbutadiene (isoprene) piperylene, and dimethylbutadienes with sulfur dioxide to form sulfolene, methyl sulfolene, and dimethyl sulfolene, respectively, and then catalytically hydrogenating the particular sulfolene, as by using a Raney nickel catalyst, to the corresponding sulfolane.

A well-known method for producing the sulfolene comprises conducting the reaction between the conjugated alkadiene and sulfur dioxide in a solution of monohydric alcohol having from 1 to 4 carbon atoms, such as for example isopropanol. The product sulfolene is subsequently hydrogenated to form sulfolane, usually in the presence of a Raney nickel catalyst.

Sulfolane in its pure state is miscible with water in all proportions. However, in synthesis of sulfolane an oily by-product of unknown structure is formed which either azeotropes with, or boils in the same range as, sulfolane and cannot be separated from the sulfolane by ordinary fractionation. Attempts to extract the oil from the sulfolane using a wide range of solvents have thus far failed.

Purity of the sulfolanes is critical if the products are to be commercially acceptable. The compounds must meet a cloud test when dissolved in water to be acceptable for certain purposes, and the presence even of traces of the by-product oil in the sulfolane causes the products to fail the cloud tests. Attempts to extract the oil from a water solution of sulfolane, or to separate it by centrifugation so that it can be characterized, have also been unsuccessful.

Accordingly, it is an object of this invention to provide a process for the purification of sulfolanes. Another object of the invention is to provide a process for separation of sulfolanes from oily by-products formed in the production of sulfolanes.

Other aspects, objects and the several advantages of the invention will be readily apparent to those skilled in the art from the following description and the appended claims.

In accordance with the present invention we have discovered that the oily by-product formed in the production of sulfolane is separated as a kettle product by an extractive type distillation wherein a substantially immiscible hydrocarbon is employed as the entraining agent. The extractive distillation process of this invention is carried out under the following conditions:

| Pressure | 1 mm. Hg | 20 mm. Hg | 760 mm. Hg |
|---|---|---|---|
| Temperature: | | | |
| Overhead | 144–154 | 245–255 | 450–462 |
| Kettle | 175–184 | 280–290 | 492–504 |

Reflux Ratio: 10:1, preferably 5:1.

The distillation pressure depends on the decomposition temperature of the particular hydrocarbon being employed. Temperatures and pressures as indicated above are preferred. The resulting sulfolanes, free of oily by-products, can be subsequently treated as such by conventional extraction with n-hexane to remove any traces of the isoparaffinic hydrocarbons which may have been carried over in the system.

While any hydrocarbon which is immiscible or only slightly miscible with sulfolane is useful as an entraining agent, preferably a 100 percent mixture of isoparaffinic hydrocarbons having a boiling point of about 450° to 525° F. and a flash point of about 260° F. is employed. Other entraining agents include Soltrol 130 (R), Soltrol 160 (R), Soltrol 200 (R), roll mill oil and mineral oil.

Since the higher-boiling hydrocarbons give a higher percentage of sulfolane in the overhead product, these entraining agents are therefore more desirable.

The Soltrol (R) entraining agents employed in the present invention are 100 percent isoparaffinic hydrocarbons and have the following distillation range and flash point:

| | Soltrol 130 | Soltrol 160 | Soltrol 200 |
|---|---|---|---|
| Distillation range, °F | 335–410 | 370–405 | 450–525 |
| Flash point, °F., 760 mm., min | 125 | 145 | 200 |

Roll mill oil is a blend of Soltrols used in roll mills. Mineral oil is liquid paraffin, a mixture of liquid hydrocarbons obtained from petroleum, a colorless liquid having a specific gravity of 0.828–0.905$^{25c}$ and a boiling point of 360° C.

The following example will further illustrate the invention.

EXAMPLE

A column 1¼ inch in internal diameter by 1 foot long packed with ¼ inch protruded packing was charged with 1000 ml. of sulfolane and 500 ml. of Soltrol 200. The sulfolane and Soltrol are almost completely immiscible. They were distilled over at a kettle temperature of 290° F. and an overhead temperature of 250° F. at 5:1 reflux ratio and 20 mm. Hg absolute pressure into 100 ml. cuts. The ratio in which they came over was 25 to 30 ml. sulfolane to 75–70 ml. Soltrol. The sulfolane phase contained phase contained only a trace of Soltrol, which was easily removed by extraction with commercial grade n-hexane. Following this the sulfolane was subjected to reduced pressure (aspirator) to remove the last traces of hexane. The sulfolane prepared in this manner gave a perfectly clear solution when diluted 1 part in 4 or 5 parts of water.

Sulfolane was prepared in the same column and at the same conditions but without Soltrol 200, and taken overhead in 10 volume percent cuts. Every cut including the kettle product gave very milky solution when dissolved in water as above.

While the above example carries out the purification batchwise, the operation can also be performed in a continuous manner. To operate continuously, the overhead product is charged to a phase separator, the upper phase is recycled to the column reboiler and the lower phase (sulfolane) is discharged to produce storage. The operating conditions are the same as those for batch production.

Reasonable variations and modifications of this invention can be made, or followed, in view of the foregoing, without departing from the spirit or scope thereof.

We claim:

1. A process for treating a mixture of a sulfolane and by-product oil formed in the production of sulfolane so as to remove the by-product oil therefrom which comprises subjecting said mixture of sulfolane and by-product oil to extractive distillation in a zone wherein an isoparaffinic hydrocarbon which is substantially immiscible in said sulfolane and having a boiling point in the range of about 335 to 525° F. and a flash point in the range of 125 to 200° F., 760 mm. Hg, is employed therein as the entraining agent in the extraction distillation zone, and thereafter recovering by-product oil-free sulfolane as a product of the process, said extractive distillation being carried out at a kettle temperature in the range of 280 to 290° F., an overhead temperature in the range of 245 to 255° F., and a pressure of about 20 mm. Hg absolute pressure.

2. A process for treating a mixture of a sulfolane and by-product oil formed in the production of sulfolane so as to remove the by-product oil therefrom which comprises subjecting said mixture of sulfolane and by-product oil to extractive distillation in a zone wherein an isoparaffinic hydrocarbon which is substantially immiscible in said sulfolane in having a boiling point in the range of about 335 to 525° F. and a flash point in the range of 125 to 200° F., 760 mm. Hg is employed therein as the entraining agent in the extractive distillation zone, and thereafter recovering by-product oil-free sulfolane as a product of the process, said extractive distillation being carried out at a kettle temperature in the range of 175 to 184° F., an overhead temperature in the range of 144 to 154° F., and a pressure of about 1 mm. Hg absolute pressure.

3. A process for treating a mixture of a sulfolane and by-product oil formed in the production of sulfolane so as to remove the by-product oil therefrom which comprises subjecting said mixture of sulfolane and by-product oil to extractive distillation in a zone wherein an isoparaffinic hydrocarbon which is substantially immiscible in said sulfolane in having a boiling point in the range of about 335 to 525° F. and a flash point in the range of 125 to 200° F., 760 mm. Hg is employed therein as the entraining agent in the extractive distillation zone, and thereafter recovering by-product oil-free sulfolane as a product of the process, said extractive distillation being carried out at a kettle temperature in the range of 492 to 504° F., an overhead temperature in the range of 450 to 462° F., and a pressure of about 760 mm. Hg absolute pressure.

4. A process according to claim 1 wherein said isoparaffinic hydrocarbon entraining agent is selected from the group consisting of
(A) an isoparaffinic hydrocarbon having a boiling point in the range of 335 to 410° F. and a flash point of 125° F.;
(B) an isoparaffinic hydrocarbon having a boiling point in the range of 370 to 405° F. and a flash point of 145° F.;
(C) an isoparaffinic hydrocarbon having a boiling point in the range of 450 to 525° F. and a flash point of 200° F., and
(D) a mixture of at least two of the said groups.

5. A process according to claim 1 wherein the extractive distillation is carried out with a reflux ratio in the range of 10:1 to 5:1.

6. A process according to claim 1 for the removal of by-product oil from the sulfolane which comprises subjecting said mixture of sulfolane and by-product oil to extractive distillation with a solution consisting of 100 percent isoparaffinic hydrocarbons having a boiling point in the range of 450 to 525° F. and a flash point of about 200° F.

7. A process for treating a mixture of a sulfolane and by-product oil formed in the production of sulfolane so as to remove the by-product oil from the sulfolane which comprises subjecting said mixture of sulfolane and by-product oil to extractive distillation in a zone carried out at a kettle temperature in the range of 280 to 290° F., an overhead temperature in the range of 245 to 225° F. and a pressure of about 20 mm. Hg absolute pressure wherein mineral oil having a specific gravity of 0.828 to 0.905$^{25c}$ and a boiling point of 360° C. is employed therein as the entraining agent in the extractive distillation zone and thereafter recovering the oil-free sulfolane as a product of the process.

References Cited

UNITED STATES PATENTS

| | | | |
|---|---|---|---|
| 2,357,028 | 8/1944 | Shiras et al. | 203—58 |
| 2,357,344 | 9/1944 | Morris et al. | 208—240 |
| 2,360,859 | 10/1944 | Evans et al. | 208—240 |
| 2,360,860 | 10/1944 | Morris et al. | 260—428.5 |
| 2,360,861 | 10/1944 | Pierotti et al. | 208—240 |
| 2,365,898 | 12/1944 | Morris et al. | 208—240 |
| 2,496,207 | 1/1950 | Handlos et al. | 203—64 X |
| 3,252,997 | 5/1966 | Ridderikoff et al. | 260—332.1 |

NORMAN YUDKOFF, *Primary Examiner.*

F. E. DRUMMOND, *Assistant Examiner.*